United States Patent [19]
Le et al.

[11] Patent Number: 5,651,138
[45] Date of Patent: Jul. 22, 1997

[54] DATA PROCESSOR WITH CONTROLLED BURST MEMORY ACCESSES AND METHOD THEREFOR

[75] Inventors: Chinh Hoang Le; James B. Eifert; Wallace B. Harwood, III, all of Austin, Tex.

[73] Assignee: Motorola, Inc., Schaumburg, Ill.

[21] Appl. No.: 363,423

[22] Filed: Dec. 21, 1994

Related U.S. Application Data

[63] Continuation-in-part of Ser. No. 298,868, Aug. 31, 1994, Pat. No. 5,617,559.

[51] Int. Cl.$^6$ ............................................. G06F 12/00
[52] U.S. Cl. ........................ 395/481; 395/484; 395/496
[58] Field of Search ............................... 395/496, 325, 395/445, 484, 855, 481

[56] References Cited

U.S. PATENT DOCUMENTS

| | | | |
|---|---|---|---|
| 4,683,534 | 7/1987 | Tietjen et al. | 364/200 |
| 4,799,199 | 1/1989 | Scales, III et al. | 365/230 |
| 4,910,656 | 3/1990 | Scales, III et al. | 364/200 |
| 5,073,969 | 12/1991 | Shoemaker | 395/725 |
| 5,255,378 | 10/1993 | Crawford et al. | 395/855 |
| 5,274,780 | 12/1993 | Nakao | 395/325 |
| 5,291,580 | 3/1994 | Boden, III et al. | 395/425 |
| 5,394,528 | 2/1995 | Kobayashi et al. | 395/325 |
| 5,488,709 | 1/1996 | Chan | 395/445 |
| 5,502,835 | 3/1996 | Le et al. | 395/496 |

OTHER PUBLICATIONS

Motorola Inc. 1990, "MC68332 User's Manual", System Integration Module, 4.3 Chip–Select Submodule, pp. 4-26-4-46.
Intel 80960CA User's Manual; 1989; Chapters 10 & 11.
PowerPC 601 RISC Microprocessor User's Manual; 1993; Chapter 8 & 9.

*Primary Examiner*—Jack B. Harvey
*Assistant Examiner*—Jigar Pancholi
*Attorney, Agent, or Firm*—Paul J. Polansky

[57] ABSTRACT

A data processor (21) includes an external bus interface circuit (33) responsive to two internal bus master devices (30, 34) to perform either a fixed or a variable burst access. The data processor (21) activates an external control signal to indicate whether a burst access is a fixed or a variable burst access. The data processor (21) indicates the port size of the accessed memory region by providing a port size signal to the external bus interface circuit (33). The external bus interface circuit (33) is responsive to the port size signal to break up the burst cycle into two or more burst cycles on the external bus (22, 23), if the accessed location corresponds to a memory (24) with a different port size than the internal bus (31).

24 Claims, 5 Drawing Sheets

DATA PROCESSOR WITH CONTROLLED BURST MEMORY ACCESSES AND METHOD THEREFOR

This application is a continuation-in-part of prior application Ser. No. 08/298,868, filed Aug. 31, 1994, now U.S. Pat. No. 5,617,559.

CROSS REFERENCE TO RELATED, COPENDING APPLICATIONS

Related subject matter is contained in the following copending patent applications:

1. Ser. No. 08/298,892, entitled "Integrated Circuit Microprocessor with Programmable Memory Interface Access Types" invented by Chinh H. Le et al., filed Aug. 31, 1994 and assigned to the assignee hereof;
2. Ser. No. 08/298,885, entitled "Method for Synchronously Accessing Memory" invented by Chinh H. Le et al., filed Aug. 31, 1994 and assigned to the assignee hereof, now U.S. Pat. No. 5,502,835, issued Mar. 26, 1996;
3. Ser. No. 08/298,638, entitled "Programmable Pin Configuration Logic Circuit for Providing a Chip Select Signal and Related Method" invented by Chinh H. Le et al., filed Aug. 31, 1994 and assigned to the assignee hereof, now U.S. Pat. No. 5,511,182, issued Apr. 23, 1996; and
4. Ser. No. 08/353,764, entitled "Method for Synchronously Accessing Memory" invented by Chinh H. Le et al., filed Dec. 12, 1994, and assigned to the assignee hereof.

FIELD OF THE INVENTION

This invention relates generally to data processors, and more particularly, to data processors which support burst memory accesses.

BACKGROUND OF THE INVENTION

In computer systems, a central processing unit (CPU) accesses memory by providing an address which indicates a unique location of a group of memory cells which collectively store the accessed data element. The CPU initiates what is referred to as a bus cycle by providing the address to an address bus, and one or more control signals to signal that the address is valid and the bus cycle has begun. A read/write control signal then indicates whether the access is to be a read access or a write access. Subsequently, a data element is either read from a data bus if the bus cycle is a read cycle, or provided to the data bus if the bus cycle is a write cycle. A memory device to accommodate such accesses is connected to the address and data buses, and provides data to the data bus during a read cycle, or stores data on the data bus during a write cycle, at a location indicated by the address on the address bus. This type of bus cycle requires at least two clock cycles, and typically may require four or more clock cycles.

In an effort to improve efficiency, computer architects have developed several additional modes for faster accesses. For example, in some integrated circuit memory devices, several storage cells are accessed simultaneously and their contents are held temporarily in a buffer. Typically, the addresses of these "extra" storage cells differ from the original access address by only one or two bits. However subsequent accesses to these cells can be accomplished by simply executing access cycles without changing the access address. In the art, such memories are referred to as "nibble mode". In some other integrated circuit memories, a portion of the original access address can be assumed for one (or more) subsequent accesses, so that only the least significant portion of the address needs to be decoded, etc. Thus, once the original access has been completed, subsequent accesses to "related" storage cells will be significantly quicker. These types of memories are sometimes referred to as "column mode" or "static column". In memory systems constructed using such enhanced performance memory devices, the effect is to allow the memory to sustain rapid transfers of several operands in "bursts" of m, where m is two (2) to the n power, n being an integer and characteristic of the selected memory device.

One example of the usefulness of a burst access is when the CPU has an on-chip cache. When the CPU accesses a line of the cache that needs to be updated (known as a cache miss), the cache requires a set of data words to be read from external memory. This operation is known as a cache line fill. The cache line may be any arbitrary number of bytes or words of data, but typically is 4 words, where a word is typically 32 bits long. By having the burst mode available, the cache line fill operation to external memory consists of a four bus cycle ("four beat") burst cycle. This four-beat burst cycle is efficient, requiring the cache to control the bus for a minimum number of clock cycles, and allows the cache line to be filled in a continuous access to reduce or eliminate coherency problems that could occur if another device accesses the memory location in between the cache's accessing the words of the cache line.

However, as time goes on, integrated circuit density will increase, adding complexity. There exists a need to accommodate this increase in integration and to have ever more flexible modes of burst operation. These problems are met with the present invention, whose features and advantages will be more clearly understood from the following detailed description taken in conjunction with the accompanying drawings.

DETAILED DESCRIPTION OF A PREFERRED EMBODIMENT

A data processor according to the present invention provides the flexibility to perform two types of burst accesses with external memory devices, both fixed and variable bursts. This flexibility allows an external bus interface circuit to be designed modularly and used in both integrated circuit data processors with only a single type of bus master device (either fixed or variable burst), as well as integrated circuit data processors with both types of bus master devices. The data processor also includes the ability to perform burst accesses to external memory when external memory has a different data bus size than the data processor's internal bus. Also, the data processor has an improved address wrapping mechanism. These advantages will become apparent with reference to a specific embodiment, as illustrated in FIG. 1 below.

Figure 1:
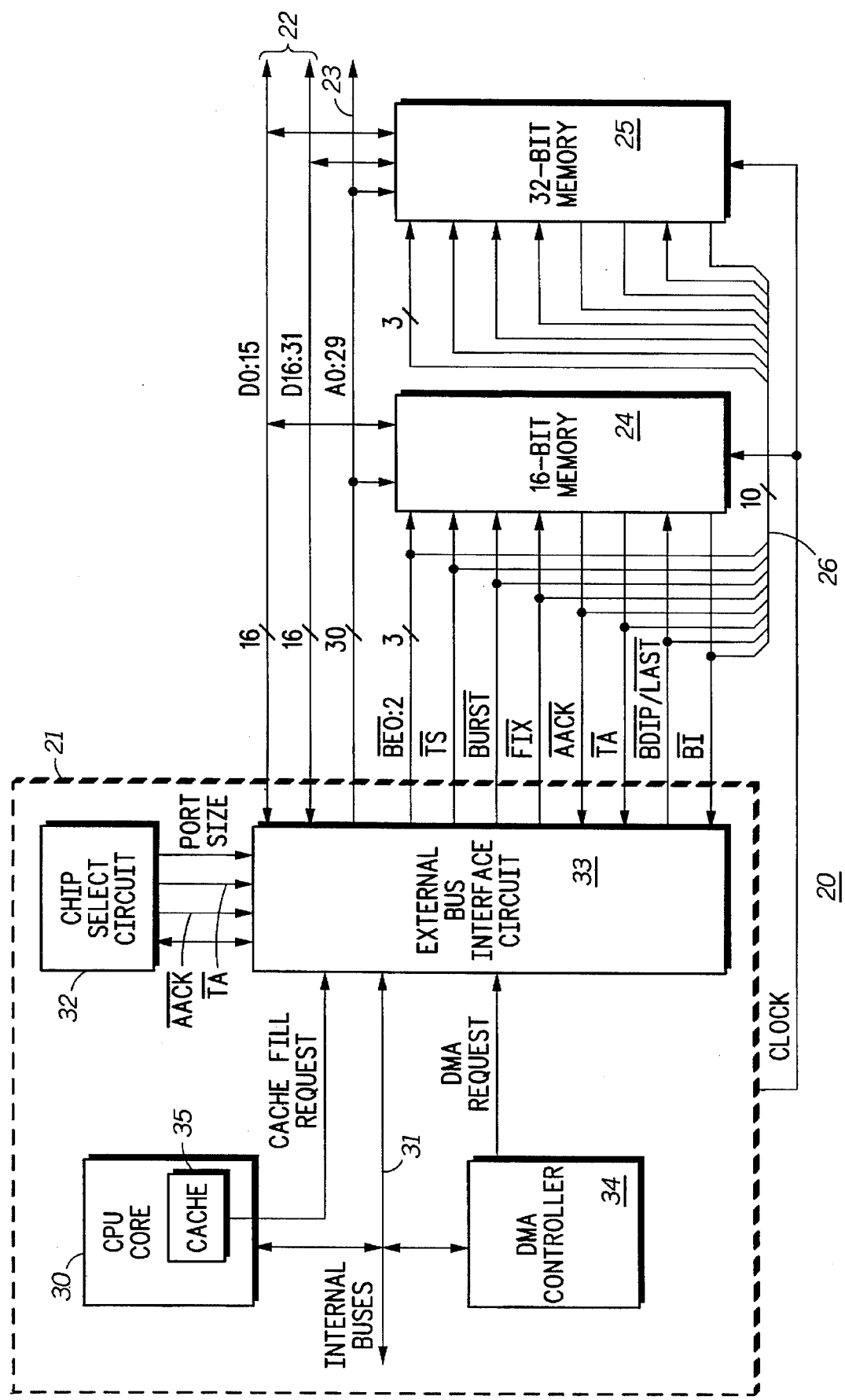
FIG. 1 illustrates in block diagram form a data processor with controlled burst memory accesses according to the present invention.

FIG. 1 illustrates in block diagram form a data processor 21 with controlled burst memory accesses according to the present invention. Data processor 21 is shown in the context of a data processing system 20 which also includes a data bus 22, an address bus 23, a first 16-bit memory device 24, a second 32-bit memory device 25, and a control bus 26. Each of data processor 21, memory 24, and memory 25 are synchronous with respect to input clock signal labeled "CLOCK". Data processor 21 has a 32-bit bidirectional data path which is broken into two sections, a first section conducting signals labeled "D0–D15" and a second section conducting signals labeled "D16–D31". Address bus 23 forms a 32-bit address bus of which A0 through A29 are conducted on address bus 23. Additional signaling through byte enable signals labeled "$\overline{BE0}$–$\overline{BE2}$" form a 32-bit byte address, but these byte enable signals are shown in FIG. 1 as being part of control bus 26.

Each of memories 24 and 25 has an input connected to address bus 23 and a bidirectional connection to data bus 22. However, 16-bit memory 24 is connected only to a lower 16 bits of 32-bit data bus 22. Memory 25 has an input connected to address bus 23 and has a bidirectional connection to each 16-bit section of data bus 22. Control bus 26 conducts ten control signals which are necessary for the operation of data processing system 20. Furthermore, some of the control signals of control bus 26 are specifically related to a first mode of operation of data processing system 20. The signals conducted on control bus 26 are further described in TABLE 1 below.

TABLE 1

| Signal Name | Signal Description |
| --- | --- |
| $\overline{BE\,0}$–$\overline{BE\,2}$ | External byte enable signals |
| $\overline{TS}$ | Transfer start. External bus interface circuit 33 activates this signal for one CLOCK cycle at the beginning of a bus access. |
| $\overline{BURST}$ | Burst cycle. |
| $\overline{FIX}$ | Fixed burst access. This signal is active to indicate a fixed, 4-beat burst access. |
| $\overline{AACK}$ | ADDRESS acknowledge. This signal terminates the address phase of a bus cycle, allowing external bus interface circuit 33 to initiate another access to a pipelineable device. |
| $\overline{TA}$ | Transfer acknowledge. This signal indicates normal completion of the data phase of a bus cycle, or of each beat during burst accesses. |
| $\overline{BDIP}$ | Burst data in progress. This signal indicates when data beats remain in a fixed burst access. |
| $\overline{LAST}$ | Last beat of a burst. This signal is active at a low-to-high transition of the CLOCK when the last data beat is transferred during a bus cycle. |
| $\overline{BI}$ | Burst inhibit. This input signal indicates that the addressed device does not have burst capability. |

Data processor 21 includes generally a central processing unit (CPU) core 30, a set of internal buses 31, a chip select circuit 32, an external bus interface circuit 33, and a direct memory access (DMA) controller 34. CPU core 30 may be implemented using any type of data processor architecture such as complex instruction set computer (CISC), reduced instruction set computer (RISC), digital signal processor (DSP), or a like architecture. In the illustrated embodiment, CPU core 30 is a RISC data processor having a Harvard architecture with separate instruction and data paths. Thus, internal bus 31 includes both an instruction bus and a data bus.

CPU core 30 also includes a cache 35 which functions as a high-speed local memory for the operation of CPU core 30. As is well known in the art, cache 35 stores frequently used instructions that are likely to be encountered often and thereby increases the performance of data processor 21. Upon detecting an access to an instruction memory location, cache 35 access external memory, that is memory external to CPU core 30, in order to fetch the corresponding memory location and a given number of adjacent memory locations. Then if CPU core 30 accesses instructions in its program adjacent to the instruction which caused cache 35 to load data from memory, then cache 35 will also contain the contents of those memory locations. However, if CPU core 30 accesses instruction memory and cache 35 does not store contents of that memory location, cache 35 will need to fetch the data from external memory. Cache 35 does this by activating a signal labeled "CACHE FILL REQUEST" which signifies a need to access several adjacent memory locations. When the external bus is available, cache 35 performs the bus cycles (in this case read cycles) through internal buses 31 to the external bus in order to fetch the requested line for storage in the cache. Thus, cache 35 functions as a bus master device, that is a device that is capable of initiating and controlling bus cycles.

Chip select circuit 32 is a circuit peripheral to CPU core 30 which increases the integration of data processor 21, thereby saving board space. After programming, chip select circuit 32 will activate signals known generally as output enable ($\overline{OE}$), write enable ($\overline{WE}$), and chip enable ($\overline{CE}$), which may be provided directly to inputs of commercially available memory integrated circuits. To accomplish this signalling, chip select circuit 32 is programmable to define memory regions with particular interface characteristics. Chip select circuit 32 receives an input address and a set of protection attributes and checks pre-programmed values for matches in one of several regions. If chip select circuit 32 detects a match, then it activates the programmed chip select signals which are connected to the memory chips residing in that region. In addition, chip select circuit 32 has the capability to return acknowledge signals to terminate the address and data phases of the external bus access. For this purpose, chip select circuit 32 may be programmed to provide address acknowledge signal $\overline{AACK}$ to signify the termination of the address phase of the access. Chip select circuit 32 also returns transfer acknowledge signal $\overline{TA}$ to indicate the termination of the data phase of the bus cycle.

Chip select circuit 32 further stores information about the size of the data interface to memory integrated circuits within the region though a signal labeled "PORT SIZE" which may be a single signal or multiple signals. For example, chip select circuit 32 would be programmed to recognize an access to 16-bit memory 24 as being a 16-bit access and would provide the PORT SIZE signal in an appropriate logic state to indicate this to external bus interface circuit 33. Likewise, chip select circuit 32 would detect an access to 32-bit memory 25 and return the PORT SIZE signal to indicate a 32-bit access. As will become apparent, the storage of information relating to the port size characteristics of external memory is important in the operation of external bus interface circuit 33 during burst accesses.

External bus interface circuit 33 has a first port connected to internal buses 31, and a second port connected to external data bus 22, external address bus 23, and external control bus 26. In addition, external bus interface circuit 33 has at least two inputs for receiving burst request signals from at least two bus master devices. In FIG. 1 external bus interface circuit 33 receives a first burst request input (CACHE FILL REQUEST) from cache 35 in CPU core 30. External bus interface circuit 33 also receives a second burst request input signal from DMA controller 34 labeled "DMA REQUEST". External bus interface circuit 33 also provides address and attribute information to chip select circuit 32 and receives several signals from chip select circuit 32 related to the interface defined in chip select circuit 32. These signals include $\overline{AACK}$, $\overline{TA}$, and PORT SIZE.

Data processor 21 also includes DMA controller 34 which has a bidirectional connection to internal buses 31 and an output for providing signal DMA REQUEST. DMA controller 34 is an example of another bus master device, in this example, one that is capable of initiating variable burst accesses. In other embodiments, data processor 21 may include only a single bus master device such as CPU core 30 or two or more bus master devices.

External bus interface circuit 33 is modular because it has inputs for responding to both a first type of bus master device which requests a fixed burst access and a second type of bus master device which requests a variable burst access. For example, whenever cache 35 activates the CACHE FILL REQUEST signal, it requires a certain predefined number of data elements to be fetched on external bus 22 to fill a cache line. The cache line size is fixed for any particular cache. On the other hand, DMA controller 34 requests data from external data bus 22 of variable size which is not known beforehand. There are several possible methods that DMA controller 34 may use to signify the length of the burst to external bus interface circuit 33. One way would be for DMA controller 34 to provide a group of signals which represent the size of the burst to external bus interface circuit 33. Then external bus interface circuit 33 could load this value into a counter and perform a burst which lasts until the counter counts to zero. An alternate way of signaling the beginning and end of the variable burst requests would be through a signal which is designated "$\overline{BDIP}_D$" (not shown in FIG. 1.) Signal $\overline{BDIP}_D$ becomes active at the start of the data phase of the burst access and becomes inactive on the last burst beat of the burst access. Because the "$\overline{BDIP}_D$" signal conveys information determining the length of the burst as a single signal as opposed to the multi-bit burst size signal, the $\overline{BDIP}_D$ technique of signaling is preferred.

Figure 2:
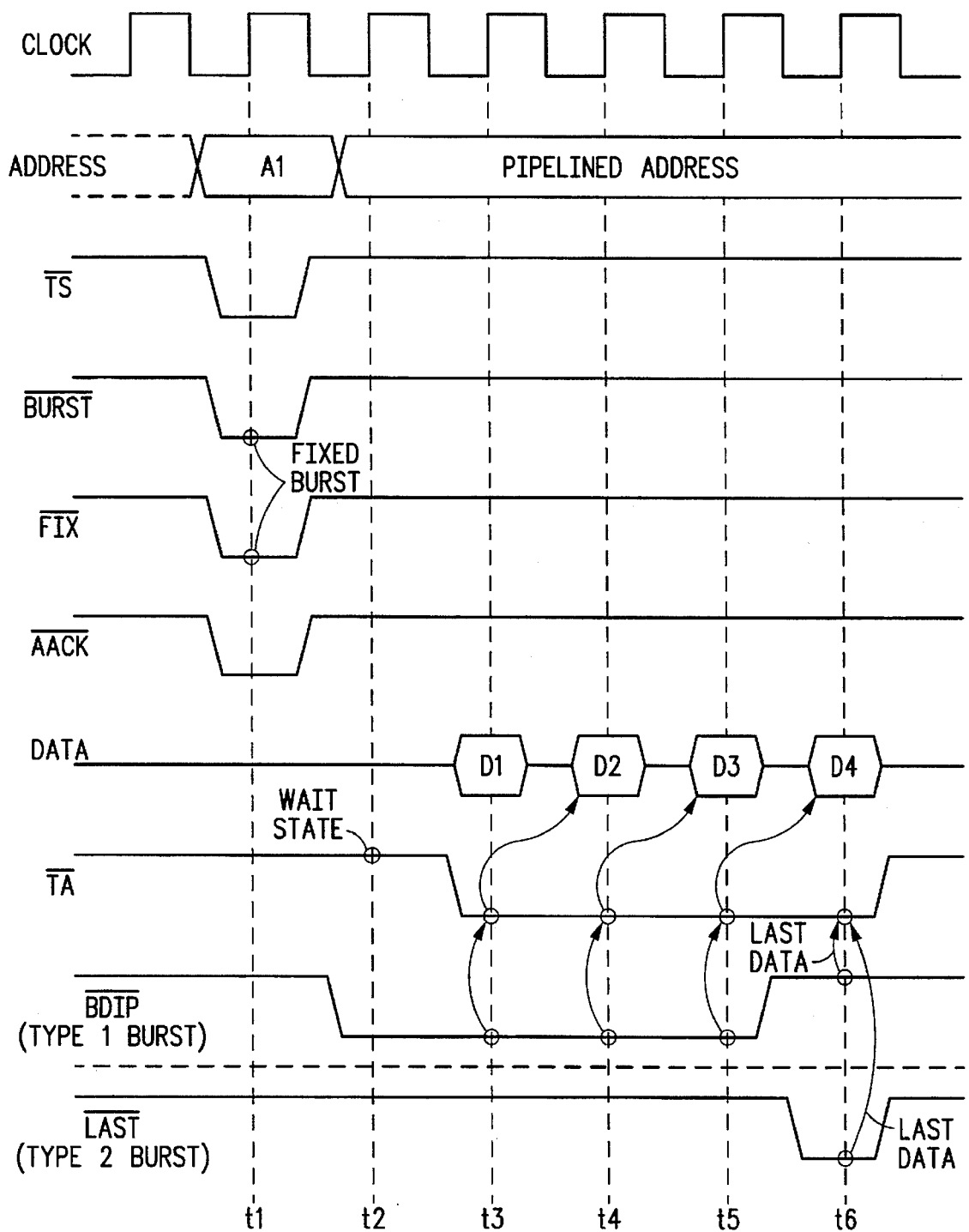
FIGS. 2 and 3 illustrate timing diagrams useful in understanding the operation of the data processor of FIG. 1.
Figure 3:
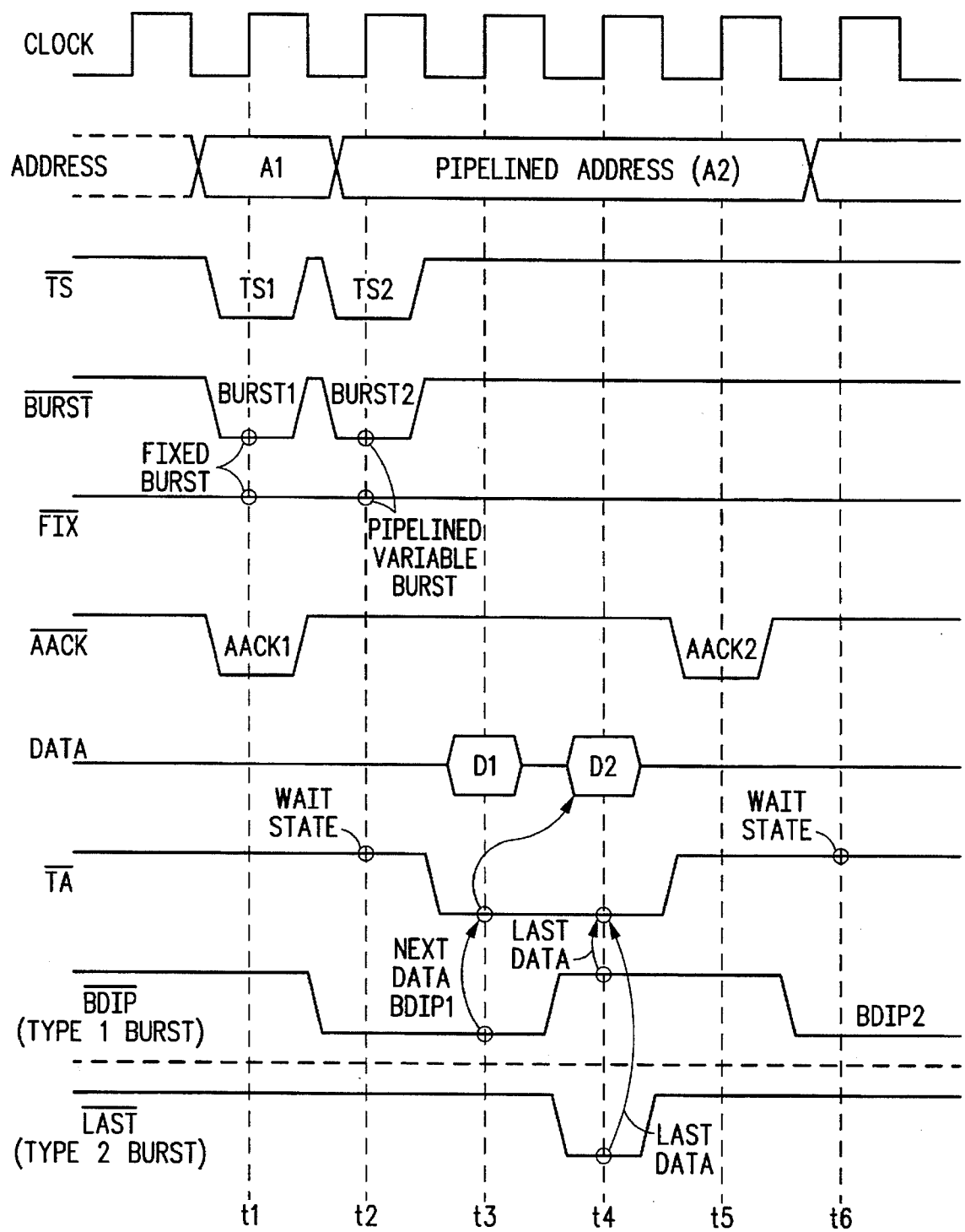

FIGS. 2 and 3 illustrate timing diagrams useful in understanding the operation of data processor 21 in FIG. 1. FIGS. 2 and 3 below are described in conjunction with FIG. 1, and reference numbers designate elements of FIG. 1. In particular, FIG. 2 illustrates a timing diagram of a fixed burst access. In the context of data processor 21, this fixed burst access would represent a burst initiated by cache 35 activating the CACHE FILL REQUEST signal. In data processing system 20, signals are timed from a low-to-high transition of the CLOCK signal. In FIG. 2, successive low to high transitions of the CLOCK signal during the burst access are designated "t1", "t2", "t3", "t4", "t5", and "t6" respectively. A set up time prior to t1, external bus interface circuit 33 activates an address labeled "A1" and signifies the start of the access by activating signal $\overline{TS}$. External bus interface circuit 33 signals that this access is to be a fixed burst access by activating both signal $\overline{BURST}$ and signal $\overline{FIX}$, a set up time prior to t1. In the embodiment illustrated by the timing diagram of FIG. 2, either an accessed memory device, or chip select circuit 32, acknowledges the address a set up time prior to t1 by activating signal $\overline{AACK}$. Furthermore in this illustrated embodiment, the memory requires one wait state which is inserted at t2 by the external memory device for chip select circuit 32 keeping signal $\overline{TA}$ inactive at t2. External bus interface circuit 33 activates signal $\overline{BDIP}$ a setup time prior to t3, signifying the beginning of the data phase and the transfer of the first data element. This first data element is transferred a set up time prior to t3 and is designated "D1" in FIG. 2. Note that the DATA signal in FIG. 2 may represent either data provided by the external bus interface circuit 33 to data bus 22, or received by external bus interface circuit 33 from data bus 22; that is, either a write cycle or a read cycle, respectively.

In response to the activation of signals $\overline{BURST}$ and $\overline{FIX}$, the accessed memory device recognizes a fixed burst access. This memory device reads in address A1 and increments an internal counter through the predetermined fixed number of access to complete the burst. In the embodiment illustrated in FIG. 2, a fixed four-beat burst is recognized through the accessed device reading or writing data elements D1, D2, D3, and D4 on subsequent clock transitions t3, t4, t5 and t6 respectively. Data processor 21 also supports a flexible burst protocol by supporting either one of two recognized burst protocols. In the first protocol which is known as the Motorola protocol, external bus interface circuit 33 activates signal $\overline{BDIP}$ to signify the transfer of the successive beats of the burst. The end of the burst is indicated by signal $\overline{BDIP}$ becoming inactive. This signal is important to indicate that the burst cycle is continuing so that for other types of accesses the burst cycle may be terminated early.

Additionally, however, the integrated circuit pin that conducts signal $\overline{BDIP}$ may be programmed to conduct signal $\overline{LAST}$ using another known burst signaling protocol. In this other known burst signaling protocol, the beats of the burst continue until signal $\overline{LAST}$ is activated on the last beat of the burst. As shown in FIG. 2, signal $\overline{LAST}$ is activated a set up time prior to t6 to indicate the last beat of the burst.

FIG. 3 illustrates a timing diagram of a variable burst access. As in FIG. 2, successive low-to-high transitions of the clock are designated t1 through t6 respectively. Also as in FIG. 2, external bus interface circuit 33 activates signal $\overline{TS}$ and signal $\overline{BURST}$ set up time prior to t1. However, unlike the timing illustrated in FIG. 2, external bus interface circuit 33 keeps signal $\overline{FIX}$ inactive to indicate that the burst is a variable length burst. As shown in FIG. 3 as in FIG. 2, the accessed memory device or chip select circuit 32 acknowledges the address phase a set up time prior to t1 by the activation of signal $\overline{AACK}$. Also as in FIG. 2, signal $\overline{TA}$ remains inactive at t2 to insert a wait state into the data phase. At time t3, data element D1 is transferred and signal $\overline{BDIP}$ is active, which signifies that a subsequent beat of the burst will occur in the next clock cycle. This occurs by the transfer of data element D2 at t4. However, also at t4, signal $\overline{BDIP}$ becomes inactive signifying that the transferred data element D2 is the last beat of the burst. Since external bus interface circuit 33 supports pipelined accesses, a subsequent pipelined addressed designated "A2" is valid set up time prior to t2 and the pipelining of the second access is indicated by external bus interface circuit 33 activating signals $\overline{TS}$ and $\overline{BURST}$, a set up time prior to t2. However, only subsequent to the last data phase of the first access at t4 does the accessed memory device or chip select circuit 32 activate signal $\overline{AACK}$ at t5. As before, either the accessed memory device or chip select circuit 32 inserts a wait state into the data phase by keeping signal $\overline{TA}$ inactive at t6. However, external bus interface circuit 33 activates signal $\overline{BDIP}$ at t6 to signify the first beat of data of the second subsequent burst access.

Figure 4:
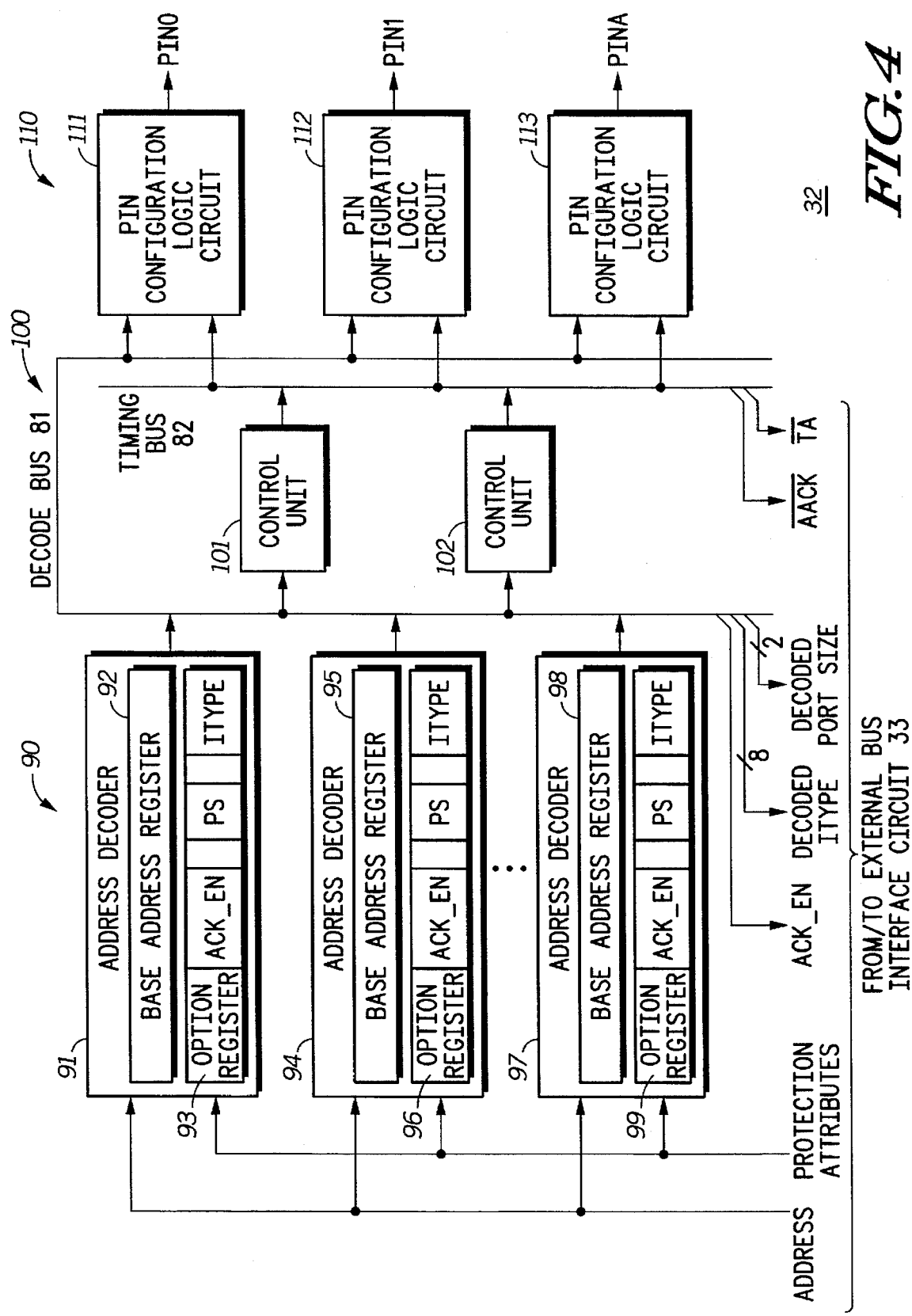
FIG. 4 illustrates a detailed block diagram of the chip select circuit of FIG. 1.

FIG. 4 illustrates a detailed block diagram of chip select circuit 32 of FIG. 1. Chip select circuit 32 is modular to allow reconfiguration for different applications. Chip select circuit 32 includes generally two buses for the interconnection of signals including a first bus labeled "DECODE BUS"

81 and a second bus labeled "TIMING BUS" 82. Chip select circuit 32 also includes an address decode stage 90, a timing control stage 100, and a pin configuration stage 110. Chip select circuit 32 is modular and reconfigurable by including a first arbitrary number of address decoders in address decode stage 90, a second arbitrary number of control units in timing control stage 100, and a third arbitrary number of pin configuration logic circuit in pin configuration stage 110.

As illustrated in FIG. 4, address decode stage 90 includes representative address decoders 91, 94, and 97. Address decoder 91 includes a base address register 92 and an option register 93. Base address register 92 defines a base address for a programmable region associated with address decoder 91. Option register 93 includes a size of the region associated with address decoder 91 and other programmable fields related to the attributes of this region. Address decoder 91 receives an address conducted on internal buses 31 through external bus interface circuit 33, and performs a comparison to see if this address is within the region defined by base address register 92 in the size field of option register 93. In response to an address match, address decoder 91 provides control signals to DECODE BUS 81. Likewise, address decoders 94 and 97 also detect if the address is within their corresponding programmable regions and provide control signals to DECODE BUS 81 accordingly. The number of address decoders in address decode stage 90 is arbitrary to accommodate different system needs, and there is a tradeoff between flexibility and chip size. For example, in some applications it is helpful to increase the number of programmable regions available to accommodate a more flexible software or system architecture. In other applications, the number of address decoders may be decreased to minimize integrated circuit cost.

In addition to the size field, there are three other fields of interest in the option register. The ACK_EN field determines whether chip select circuit 32 returns the $\overline{AACK}$ and $\overline{TA}$ signals when an address falls within a region programmed in chip select circuit 32. If the ACK_EN field set to a binary one, chip select circuit 32 returns the transfer acknowledge $\overline{TA}$ and address acknowledge $\overline{AACK}$ fields for the region. A further field known as the transfer acknowledge delay (TA_DLY) field causes chip select circuit 32 to insert wait states before returning the $\overline{TA}$ signal to external bus interface circuit 33. An interface type (ITYPE) field also affects when chip select circuit 32 returns $\overline{TA}$, as will be further explained below.

The second field of option register 93 of particular interest is a field known as the port size (PS) field. The PS field is an encoded field which indicates the data bus size of the memory device within the accessed region. The encoding of the port size field is illustrated in TABLE 2 below:

TABLE 2

| PS (Binary) | Port Size |
|---|---|
| 00 | Reserved |
| 01 | 16-bit port |
| 10 | 32-bit port |
| 11 | Reserved |

Note that smaller or larger port sizes may be encoded in other embodiments and external bus interface circuit 33 will control burst accesses accordingly.

The ITYPE field defines different interface types, which include both burstable and non-burstable interfaces. The encoding of the ITYPE field is shown in TABLE 3 below:

TABLE 3

| ITYPE Field binary | Device Interface Access Type |
|---|---|
| 0000 | Generic asynchronous region with output buffer turn off time of less than or equal to one clock period. A device with this interface type is not pipelineable. |
| 0001 | Generic asynchronous region with output buffer turn off time of two CLOCK periods. A device with this interface type is not pipelineable. |
| 0010 | Synchronous region with an asynchronous $\overline{OE}$. A device with this interface type is pipelineable, can function as an asynchronous device, and has the ability to hold off its internal data on read accesses until $\overline{OE}$ is activated. |
| 0011 | Synchronous region with an early synchronous $\overline{OE}$. A device with this interface type is pipelineable, can function as an asynchronous device, and has the ability to hold off its internal data on a read access until $\overline{OE}$ is activated. A device accessed by this interface type must have at least one wait state and if TA_DLY indicates zero wait states, chip select circuit 32 generates the $\overline{OE}$ as if the region had one wait state. |
| 0100 | Reserved. If erroneously programmed, the corresponding pin remains inactive. |
| 0101 | Burstable region with only a fixed burst access capability. This interface has an $\overline{OE}$, is pipelineable, and can hold off its internal data until $\overline{OE}$ is activated. This interface may function as an asynchronous interface, but provides data only after the number of wait states required by the interface and the activation of $\overline{OE}$. In this mode, the interface will keep the first data beat valid until the $\overline{BDIP}$ signal indicates that it should send out the next data. The $\overline{OE}$ for this region is an asynchronous $\overline{OE}$. |
| 0110 | Reserved. If erroneously programmed, the corresponding pin remains inactive. |
| 0111 | Burstable region with only fixed burst access capability, but the interface has an $\overline{OE}$, is pipelineable, and can hold off its internal data until $\overline{OE}$ is activated. This interface may function as an asynchronous interface, but provides data only after the number of wait states required by the interface and $\overline{OE}$ is activated. In this mode, the interface will keep the first data beat valid until the $\overline{BDIP}$ signal indicates that it should send out the next data. The $\overline{OE}$ for this region is a synchronous $\overline{OE}$. |
| 1000 | Burstable region with fixed burst access only. This interface contains a |

TABLE 3-continued

| ITYPE Field binary | Device Interface Access Type |
|---|---|
| | wait state counter and may not have an $\overline{OE}$ so the device will drive the data out after the number of wait states it requires. This type cannot hold off its internal data until the data bus is available so it is not very pipelineable. This interface may function as an asynchronous interface, but provides data only after the number of wait states has been satisfied and will keep the first data beat valid for only one clock. |
| 1001 | Same as ITYPE = 0011 with the added feature of early overlapping of accesses to the region. This type of interface must be able to pipeline another access to it a CLOCK period before it drives valid data out on read or receives data on write for the previous access. |
| 1010–1111 | Reserved. If erroneously programmed, the corresponding pin remains inactive. |

Of the eight possible interface access types, ITYPEs 5, 7, and 8 define burstable regions.

Timing control stage 100 includes a second arbitrary number of control units. In timing control stage 100, two control units, 101 and 102, are illustrated. Timing control stage 100 functions as an access state machine to provide chip select signals to the external bus, and each of control units 101 and 102 has an input connected to DECODE BUS 81 for receiving decoded signals to indicate whether a bus cycle in progress matches the attributes of one or more programmable regions. In response, a selected one of the control units in timing control stage 100 provides sequential timing information to TIMING BUS 82 to reflect the appropriate timing for the given programmed interface type. The number of control units selected for timing control stage 100 determines the number of pending overlapping memory accesses in progress. This number of pending memory accesses is also known as the pipeline depth.

For example, address decoder 91 in address decode stage 90 recognizes an access to its corresponding programmable region and provides control signals to DECODE BUS 81 in response. In timing control stage 100, a control unit such as control unit 101 becomes associated with this bus cycle and provides timing signals to TIMING BUS 82 for this access during the pendency of this access. A second access may take place during the first access and an address decoder in address decode stage 90 may recognize an access to its corresponding programmable region and having attributes matching those programmed in its option register and provide control signals to DECODE BUS 81. A second control unit such as control unit 102 may then begin providing timing signals to TIMING BUS 82 to overlap one or more chip select control signals for this access as determined by the interface type.

Pin configuration stage 110 includes a third arbitrary number of pin configuration logic circuits. Each pin configuration logic circuit corresponds and is dedicated to an integrated circuit pin. The integrated circuit pin, however, may be shared between this chip select signal and another signal, and have its function programmably set.

This third arbitrary number may vary between applications in order to allow better tradeoffs between flexibility and system costs. For example, in some applications where cost is not the most important factor, a greater number of pin configuration logic circuits may be included to provide more flexibility and the ability to provide chip select signals for a greater number of memory devices. In other applications in which cost is a greater consideration, a fewer number of pin configuration logic circuits may be used.

In pin configuration stage 110, representative pin configuration logic circuits 111, 112, and 113 are shown providing output signals labeled "PIN0", "PIN1", and "PINA", respectively. Each pin configuration logic circuit has one input connected to DECODE BUS 81 for receiving control signals and a second input connected to TIMING BUS 82 for receiving timing information. Because each pin configuration logic circuit receives all possible timing information, each pin configuration logic circuit may be configured to be any of a group of chip select functions. For example, pin configuration logic circuit 111 may be configured to be any one of the $\overline{CE}$, $\overline{WE}$, or $\overline{OE}$ signals, depending upon how pin configuration logic circuit 111 is programmed. Thus, by including a first arbitrary number of address decoders in address decode stage 90, a second arbitrary number of control units and timing control stage 100, and a third arbitrary number of pin configuration logic circuits in pin configuration stage 110, chip select circuit 32 provides maximum flexibility by defining arbitrary number of memory regions, arbitrary access pipeline depth, and an arbitrary number of chip select signals. These arbitrary numbers may be varied between embodiments to maximize the available tradeoffs.

Figure 5:
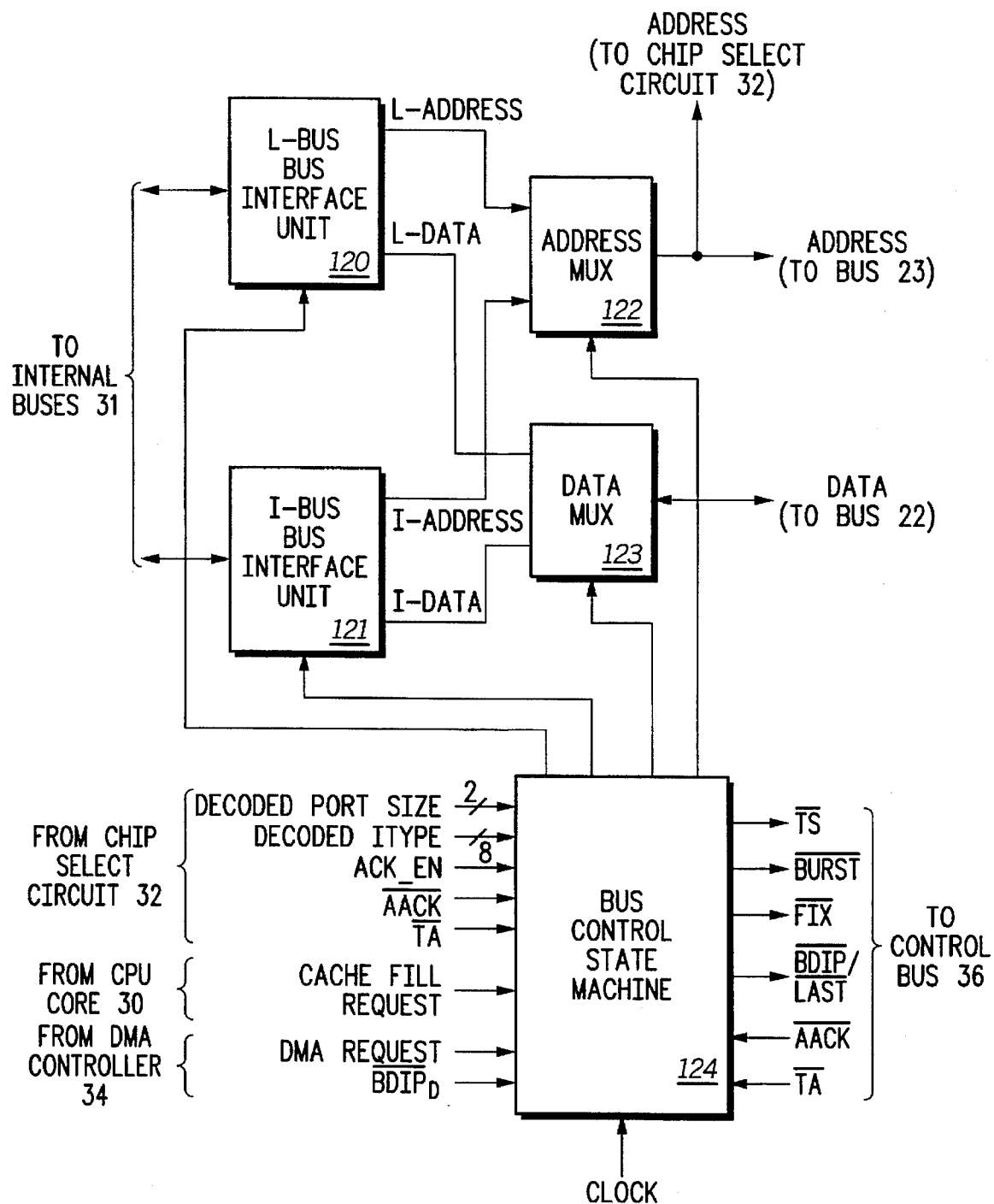
FIG. 5 illustrates a detailed block diagram of the external bus interface circuit of FIG. 1.

FIG. 5 illustrates a detailed block diagram of external bus interface circuit 33 of FIG. 1. Now considering FIG. 5 in conjunction with FIG. 1, external bus interface circuit 33 includes generally a first bus interface unit labelled "L-BUS BUS INTERFACE UNIT" 120, a second bus interface unit "I-BUS BUS INTERFACE UNIT" 121, an address multiplexer (MUX) 122, a data MUX 123, and a bus control state machine 124. As noted earlier, internal buses 31 are Harvard buses including separate instruction and data buses. Bus interface unit 120 is connected to the data portion of internal buses 31. This data portion is known as the "L-BUS". Bus interface unit 120 separates the instruction and data portions of the L-BUS into portions labeled "L-ADDRESS" and "L-DATA" under the control of bus control state machine 124. Also, bus interface unit 121 is connected to the instruction portion of internal buses 31 and separates the instruction portion into an address portion labeled "I-ADDRESS" and a data portion labeled "I-DATA" also under the control of bus control state machine 124. Thus, external bus interface circuit 33 must arbitrate between L-BUS and I-BUS accesses to provide only a single access to the external bus.

Address MUX 122 has a first input connected to bus interface unit 120 for receiving the L-ADDRESS, a second input connected to bus interface unit 121 for receiving the I-ADDRESS, and an output for providing the ADDRESS to address bus 23 and also to chip select circuit 32 under the control of bus control state machine 124. Data MUX 123 has a first input connected to bus interface unit 120 for receiving the L-DATA, a second input connected to bus interface unit 121 for receiving the I-DATA, and a bidirectional connection to data bus 22. Data MUX 123 operates to control the transfer of data to and from data bus 22 under the control of bus control state machine 124.

Bus control state machine 124 is a conventional state machine designed to implement the interface described above and especially described with respect to FIGS. 2 and 3. Bus control state machine 124 is operative synchronously with the CLOCK signal. Bus control state machine 124 receives several input signals from chip select circuit 32 including the 2-bit DECODED PORT SIZE, an 8-bit decoded I-ITYPE, the ACK_EN signal, the $\overline{\text{AACK}}$ signal, and the $\overline{\text{TA}}$ signal. As noted previously, whether the $\overline{\text{AACK}}$ and $\overline{\text{TA}}$ signals from chip select circuit 32 or the external memory device are used depends on the state of the ACK_EN signal. In addition, bus control state machine 124 receives control signals from CPU core 30 and specifically from cache 35 thereof including the CACHE FULL REQUEST signal. Bus control state machine 124 also receives control signals from DMA controller 34 including the DMA request signal and the $\overline{\text{BDIP}}_D$ signal. Bus control state machine 124 also has inputs for receiving an $\overline{\text{AACK}}$ and a $\overline{\text{TA}}$ signal from control bus 26 which may not be implemented in some applications. Bus control state machine 124 also has outputs for providing the $\overline{\text{TS}}$, $\overline{\text{BURST}}$, $\overline{\text{FIX}}$, and $\overline{\text{BDIP/LAST}}$ signals. Bus control state machine 124 is a conventional sequential logic state machine which provides the $\overline{\text{TS}}$, $\overline{\text{BURST}}$, $\overline{\text{FIX}}$, and $\overline{\text{BDIP/LAST}}$ signals as previously indicated in timing diagrams of FIGS. 2 and 3.

If the accessed memory device is burst inhibited, then external bus interface circuit 33 breaks the internal fixed burst access into single accesses on the external bus. However, if the accessed device is burstable (ITYPE 5, 7, or 8), then external bus interface circuit 33 performs the accesses differently depending on the port size and the starting address of the burst. Bus control state machine 124 has a mechanism to implement the fixed, 4-beat burst cycles to small port devices and to control wrapping for different ADDRESS alignments. In this context, an ADDRESS is considered to be "double word" aligned if it falls on a double word boundary. A double word boundary occurs when the four least-significant ADDRESS bits are 0000 or 1000 binary. An ADDRESS which is not double word aligned is considered to be "word" aligned if it falls on a word boundary but not on a double word boundary. A word-aligned ADDRESS occurs when the four least-significant ADDRESS bits are 0100 or 1100 binary.

External bus interface circuit 33 performs a sequence of beats depending on the port size and whether the ADDRESS is double-word aligned or only word-aligned. A burst access to an external 32-bit device is straightforward, as shown in TABLE 4 below:

TABLE 4

| Beat | Alignment (Four Least-Significant ADDRESS Bits) | | | |
|---|---|---|---|---|
| 1st | 0000 | 0100 | 1000 | 1100 |
| 2nd | 0100 | 1000 | 1100 | 0000 |
| 3rd | 1000 | 1100 | 0000 | 0100 |
| 4th | 1100 | 0000 | 0100 | 1000 | where external bus interface circuit 33 provides the ADDRESS for the first beat of the burst, and subsequent addresses are provided by the internal address counter of 32-bit memory 25.

External bus interface circuit 33 performs a fixed access such as a cache line fill as two four-beat burst accesses to a small port (16-bit) device if the starting address is double-word aligned, as shown in TABLE 5 below:

TABLE 5

| Burst/Beat | Alignment (Four Least-Significant ADDRESS Bits) | |
|---|---|---|
| 1st/1st | 0000 | 1000 |
| 1st/2nd | 0010 | 1010 |
| 1st/3rd | 0100 | 1100 |
| 1st/4th | 0110 | 1110 |
| 2nd/1st | 1000 | 0000 |
| 2nd/2nd | 1010 | 0010 |
| 2nd/3rd | 1100 | 0100 |
| 2nd/4th | 1110 | 0110 | where external bus interface circuit 33 provides a new ADDRESS on the first beat of each burst. Subsequent addresses are provided by the internal address counter of the small port device (such as memory 24).

If, however, a starting address of a fixed burst access to the small port device is not double-word aligned, external bus interface circuit 33 performs the access as a two-beat burst access, followed by a four-beat burst access, followed by a two-beat burst access, as shown in TABLE 6 below:

TABLE 6

| Burst/Beat | Alignment (Four Least-Significant ADDRESS Bits) | |
|---|---|---|
| 1st/1st | 0100 | 1100 |
| 1st/2nd | 0110 | 1110 |
| 2nd/1st | 1000 | 0000 |
| 2nd/2nd | 1010 | 0010 |
| 2nd/3rd | 1100 | 0100 |
| 2nd/4th | 1110 | 0110 |
| 3rd/1st | 0000 | 1000 |
| 3rd/2nd | 0010 | 1010 |

For each possible alignment and port size, external bus interface circuit 33 makes sure that DATA is provided to internal buses 31 in the proper sequence.

While the invention has been described in the context of a preferred embodiment, it will be apparent to those skilled in the art that the present invention may be modified in numerous ways and may assume many embodiments other than that specifically set out and described above. For example, the external bus interface circuit may recognize the start and end of a variable burst access by various signalling techniques. In addition, different fixed burst sizes may be supported. Accordingly, it is intended by the appended claims to cover all modifications of the invention which fall within the true spirit and scope of the invention.

We claim:

1. A data processor with controlled burst memory accesses, comprising:

an internal data bus having a first predetermined width;

a central processing unit having a data path of said first predetermined width coupled to said internal data bus, for performing instructions and accessing memory, and having a control output terminal for providing a memory access request signal to request an access of a first predetermined number of data elements in a corresponding first predetermined number of accesses;

a chip select circuit coupled to said central processing unit, having a control output for providing a port size signal indicative of whether an external memory coupled to an external data bus has said first predetermined width or a second predetermined width; and an external bus interface circuit having a first port coupled to said internal data bus, a second port coupled to said external data bus, and control input terminals for receiving said memory access request signal and said port size signal;

said external bus interface circuit responsive to said memory access request signal to provide said first predetermined number of data elements each having said first predetermined width to said internal data bus;

said external bus interface circuit further responsive to said port size signal either to perform said first predetermined number of accesses to said external memory if said port size signal indicates that said external memory has said first predetermined width, or to perform a second predetermined number of accesses to said external memory if said port size signal indicates that said external memory has said second predetermined width, wherein said external bus interface circuit further performs said second predetermined number of accesses in a plurality of burst cycles, wherein said external bus interface circuit performs a number of burst cycles dependent on a starting address provided by said central processing unit.

2. The data processor of claim 1 wherein said first predetermined width is equal to thirty-two bits, and wherein said second predetermined width is equal to sixteen bits.

3. The data processor of claim 1 wherein said external bus interface circuit provides a control signal indicative of a burst data cycle in progress to said external memory, wherein an inactivation of said control signal in a given clock period indicates that a last data beat of said burst data cycle has occurred in said given clock period.

4. A data processor with controlled burst memory accesses, comprising:

an internal data bus having a first predetermined width;

a central processing unit having a data path of said first predetermined width coupled to said internal data bus, for performing instructions and accessing memory, and having a control output terminal for providing a memory access request signal to request an access of a first predetermined number of data elements in a corresponding first predetermined number of accesses;

a chip select circuit coupled to said central processing unit, having a control output for providing a port size signal indicative of whether an external memory coupled to an external data bus has said first predetermined width or a second predetermined width; and an external bus interface circuit having a first port coupled to said internal data bus, a second port coupled to said external data bus, and control input terminals for receiving said memory access request signal and said port size signal;

said external bus interface circuit responsive to said memory access request signal to provide said first predetermined number of data elements each having said first predetermined width to said internal data bus;

said external bus interface circuit further responsive to said port size signal either to perform said first predetermined number of accesses to said external memory if said port size signal indicates that said external memory has said first predetermined width, or to perform a second predetermined number of accesses to said external memory if said port size signal indicates that said external memory has said second predetermined width, wherein said external bus interface circuit performs first and second four-beat burst cycles in response to a starting address having a first alignment, and wherein said external bus interface circuit performs a first two-beat burst cycle, a second four-beat burst cycle, and a third two-beat burst cycle in response to said starting address having a second alignment.

5. The data processor of claim 4 wherein said external bus interface circuit activates a control signal in a given clock period to indicate a last data beat of a burst data cycle during said given clock period.

6. The data processor of claim 4 wherein said starting address is in said first alignment when a four least significant bits thereof are equal to 0000 or 1000, and wherein said starting address is in said second alignment when four least significant bits thereof are equal to 0100 or 1100.

7. An integrated circuit data processor with controlled burst memory accesses, comprising:

an internal bus;

a first internal bus master device coupled to said internal bus, for performing a first burst access having a predetermined number of data beats by providing a first burst request signal to a control output terminal thereof;

a second internal bus master device coupled to said internal bus, for performing a second burst access having a variable number of data beats by providing a second burst request signal to an output terminal thereof, said second internal bus master device indicating a start and an end of said second burst access; and an external bus interface circuit having a first port coupled to said internal bus, a second port coupled to an external data bus, control input terminals for receiving said first and second burst request signals, and a control output terminal for providing a fix signal;

said external bus interface circuit activating said fix signal and performing at least one corresponding external burst cycle to transfer said predetermined number of data beats between said first internal bus master device and said external data bus in response to said first burst request signal;

said external bus interface circuit keeping said fix signal inactive and performing at least one external burst cycle to transfer said variable number of data beats between said second internal bus master device and said external data bus in response to said second burst request signal.

8. The integrated circuit data processor of claim 7 wherein said second internal bus master device comprises a direct memory access controller.

9. The integrated circuit data processor of claim 7 wherein said second internal bus master device indicates said start of said second burst access by activating a control signal and indicates said end of said second burst access by deactivating said control signal.

10. The integrated circuit data processor of claim 7 wherein said second internal bus master device indicates said start of said second burst access by activating a first control signal and indicates said end of said second burst access by activating a second control signal.

11. The integrated circuit data processor of claim 7 wherein said first internal bus master device comprises a cache and provides said first burst request signal to perform a line fill of said cache.

12. The integrated circuit data processor of claim 11 wherein said first internal bus master device further comprises a central processing unit of said integrated circuit data processor.

13. An external bus interface circuit comprising:

control input terminals for receiving first and second burst request signals;

an address input terminal for receiving a burst address from an internal bus;

an address output terminal for providing an address to an external bus;

a control output terminal for providing a fix signal;

an address transfer element having an input coupled to said internal bus, a control input terminal, and an output coupled to said external bus;

a data transfer element having a first terminal coupled to said internal bus, a control input terminal, and a second terminal coupled to said external bus; and a state machine coupled to said control input terminals and said control output terminal of said external bus interface circuit;

said state machine activating said fix signal and performing at least one corresponding external burst cycle by activating said address and data transfer elements to transfer a predetermined number of data beats between said internal bus and said external bus in response to said first burst request signal;

said external bus interface circuit keeping said fix signal inactive and performing at least one external burst cycle by activating said address and data transfer elements to transfer a variable number of data beats between said internal bus and said external bus in response to said second burst request signal;

whereby said external bus interface circuit may be variously used in integrated circuit data processors with only a fixed burst access device, only a variable burst access device, or with both fixed and variable burst access devices.

14. The external bus interface circuit of claim 13 wherein said state machine further provides a control signal to said control output terminal of said external bus interface circuit, and activates said control signal to indicate a start of a burst access, and deactivates said control signal to indicate an end of said burst access.

15. The external bus interface circuit of claim 13 wherein said state machine further provides first and second control signals to said control output terminal of said external bus interface circuit, activates said first control signal to indicate a start of a burst access, and activates said second control signal to indicate an end of said burst access.

16. A method for executing controlled burst memory accesses in a data processor, the data processor having a bus master device with a data path of a first predetermined width, the data processor for being coupled to an external memory having a second predetermined width, comprising the steps of:

detecting a burst access by said bus master device to the external memory;

receiving and storing a starting address of said burst access;

performing first and second burst accesses each having a first predetermined number of beats in response to said starting address having a first predetermined alignment;

performing third, fourth, and fifth burst accesses in response to said starting address having a second predetermined alignment;

said third, fourth, and fifth burst accesses having third, fourth, and fifth predetermined numbers of beats, respectively; and responding to said burst access by the bus master device by transferring a plurality of data elements of said first predetermined width between the external memory and said bus master device during each beat of said burst access, said plurality of data elements transferred during either, said first and second burst accesses if said starting address has said first predetermined alignment, or during said third, fourth, and fifth burst accesses if said starting address has said second predetermined alignment.

17. The method of claim 16 wherein said step of performing third, fourth, and fifth burst accesses comprises the step of performing third, fourth, and fifth burst accesses in response to said starting address having a second predetermined alignment, said third, fourth, and fifth burst accesses having third, fourth, and fifth predetermined numbers of beats, respectively.

18. A data processor with controlled burst memory accesses, comprising:

an internal data bus having a first predetermined width;

a central processing unit having a data path of said first predetermined width coupled to said internal data bus, for performing instructions and accessing memory, and having a control output terminal for providing a memory access request signal to request an access of a first predetermined number of data elements in a corresponding first predetermined number of accesses; and an external bus interface circuit having a first port coupled to said internal data bus, a second port coupled to said external data bus, and control input terminals for receiving said memory access request signal and a port size signal;

said external bus interface circuit responsive to said memory access request signal to provide said first predetermined number of data elements each having said first predetermined width to said internal data bus;

said external bus interface circuit further responsive to said port size signal either to perform said first predetermined number of accesses to an external memory, coupled to an external data bus, if said port size signal indicates that said external memory has said first predetermined width, or to perform a second predetermined number of accesses to said external memory if said port size signal indicates that said external memory has said second predetermined width, a value of said second predetermined number dependent on a starting address provided by said central processing unit.

19. The data processor of claim 18 further comprising a chip select circuit coupled to said central processing unit, having a control output for providing said port size signal to indicate whether said external memory has said first predetermined width or a second predetermined width.

20. The data processor of claim 19 wherein said chip select circuit has an input for receiving said starting address from said central processing unit, and an output for providing said port size signal corresponding to said external memory by determining whether said starting address is within a predetermined range of addresses associated with said external memory.

21. The data processor of claim 18 wherein said external bus interface circuit performs first and second four-beat burst cycles in response to said starting address having a first alignment, and wherein said external bus interface circuit performs a first two-beat burst cycle, a second four-beat burst cycle, and a third two-beat burst cycle in response to said starting address having a second alignment.

22. The data processor of claim 21 wherein said starting address is in said first alignment when a four least significant bits thereof are equal to 0000 or 1000, and wherein said starting address is in said second alignment when four least significant bits thereof are equal to 0100 or 1100.

23. A method for executing controlled burst memory accesses in a data processor, comprising the steps of:

detecting a memory access request requiring a first predetermined number of data elements by a first internal bus master device of the data processor;

activating a fix signal and performing at least one corresponding external fixed burst cycle on an external bus to provide said first predetermined number of data elements to said first internal bus master device in response to a first memory access request signal;

detecting a memory access request requiring a variable number of data elements by a second internal bus master device of the data processor; and keeping said fix signal inactive and performing at least one external burst cycle on said external bus to provide said variable number of data elements to said second internal bus master device in response to a second memory access request signal and while said second memory access request signal is active.

24. The method of claim 23 further comprising the step of terminating said at least one external burst cycle by inactivating a control signal in response to said second internal bus master device inactivating said second memory access request signal.

* * * * *